May 30, 1961     F. T. IRGENS     2,986,180
SAW CHAIN
Filed Sept. 3, 1959
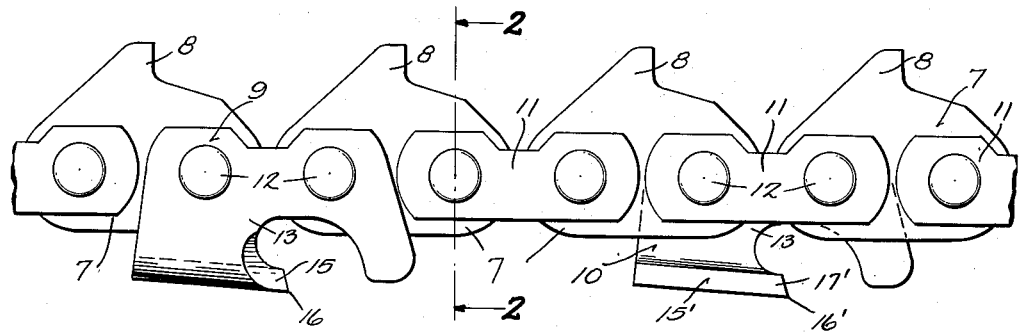
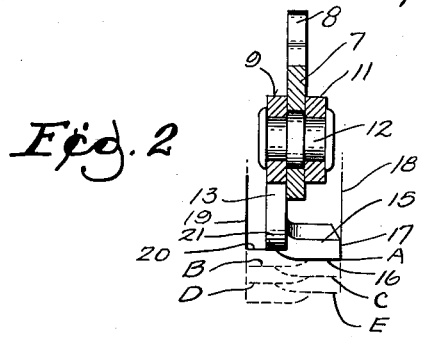
INVENTOR.
FINN T. IRGENS
BY
Wheeler, Wheeler & Wheeler
ATTORNEYS

United States Patent Office 2,986,180
Patented May 30, 1961

2,986,180

SAW CHAIN

Finn T. Irgens, Wauwatosa, Wis., assignor to Outboard Marine Corporation, Waukegan, Ill., a corporation of Delaware Filed Sept. 3, 1959, Ser. No. 837,817

2 Claims. (Cl. 143—135)

This invention relates to a saw chain with side link router teeth having free end cutting edges.

It is sought to provide smoother action, each consecutive chip being cut entirely free, and easier sharpening by doing the cutting with the free end portions of the router teeth, at the ends thereof opposite the side links on which the respective shanks are mounted, the cutting edges not extending onto the shanks.

In each instance, the router tooth is desirably mounted on an outside link and extends across the center line of the chain to do its cutting with the free end portion which lies at the opposite side of the chain from the supporting shank. The projection of the router tooth is such that said free end portion lies beyond the farthest projection of the rivet which connects its link to other links of the chain.

The router teeth are allochiral. In one disclosed embodiment, a depth gauge is carried by the same outer link which carries a router tooth. In another embodiment, the depth gauge is mounted on the center link. In both instances the depth gauge desirably operates in that portion of the cut made by the last preceding router tooth.

In the drawings:

Fig. 1 is a fragmentary side elevation of a chain embodying the invention.

Fig. 2 is a view taken in section on the line 2—2 of Fig. 1, the successive levels and sides of the kerf being diagrammatically illustrated in broken lines.

Fig. 3 is a view in perspective of an inverted tooth of the type disclosed in Figs. 1 and 2.

Fig. 4 is a view similar to Fig. 2 showing a modified router tooth structure.

Fig. 5 is a view similar to Fig. 1 fragmentarily illustrating a chain employing a different depth gauge arrangement.

Fig. 6 is a view taken in section on the line 6—6 of Fig. 5.

In each case, the embodiments herein disclosed comprise center links and side links connected by rivets. In the construction of Figs. 1 to 3, the center links 7 carry the drive teeth 8 which receive motion from the power driven sprocket (not shown). The center links are connected with each other by means of allochiral side links 9 and 10 which carry router teeth and alternating side links 11 which are identical and do not carry router teeth. One of the links 11 is used at the side of the chain opposite each of the allochiral tooth carrying links 9 and 10. The usual rivets 12 pivotally connect each of the center links 7 between a pair of side links.

Each of the router-tooth-carrying side links has a shank portion 13 from which the router tooth 15 projects laterally and forwardly as clearly shown in Figs. 1, 2 and 3. The shank portion is in the plane of the link. The router tooth 15 is formed to extend substantially transversely beneath the center links 7, its cutting edge 16 extending to a point beyond the rivet and terminating in a free end having a vertical cutting edge at 17 which forms the side wall 18 of a kerf in the work. It will be noted that the vertical cutting edge 17 at the free end of the router tooth 15 is spaced beyond the end of the rivet 12.

The complementary allochiral cutting tooth 15' of the left hand router-carrying link 10 is identical except that it projects in the opposite direction as shown in Fig. 1, with its horizontal cutting edge 16' and its vertical cutting edge 17' operating at the opposite side of the kerf adjacent the wall 19 thereof (Fig. 3). In each instance, therefore, the cutting edges of the respective router teeth operate on the opposite side of the kerf from that adjacent which the respective shanks are located.

The tooth illustrated at 15 in Fig. 2 is cutting the work at the level indicated at A, being approximately horizontal from the center line of the kerf to the side wall 18 thereof. The allochiral link 10 which carries the next following router tooth 15' will cut the work at the level indicated by reference character B in Fig. 2. In each instance, the depth of the cut will be less than the thickness of the router tooth, whereby the shank is not required for cutting and the lateral cutting is done at the side of the kerf opposite that which is proximate to the shank. Similarly, successive cuts will be made at C, D and E.

This arrangement tends to assure a fairly smooth surface at the bottom of the kerf at the side thereof last traversed by a router tooth, such surface being represented by reference character 20 in Fig. 2, and being important because it is traversed by the depth gauge 21 which, in the constructions of Figs. 1, 2 and 3 is carried by the same allochiral link upon which the respective router tooth is mounted. In these constructions, the depth gauge is in the plane of the shank, whereas the cutting edges of the respective teeth operate at the other side of the kerf.

The construction of Fig. 4 is very similar to that already described except that the router tooth 150 is curved upwardly at its free end portion whereby the cutting margin 160 is continuous from its generally horizontal portion to its generally upright portion 170. The resulting kerf will obviously be rounded adjacent the side walls instead of having a right angle corner between each side wall and the successive levels of its bottom as in the use of the tooth shown in Figs. 1 to 3.

In the construction shown in Figs. 5 and 6, the outer link 90 which carries the router tooth 151 may be identical, so far as the router tooth is concerned, either with the structure of Figs. 1 to 3 or that of Fig. 4, the structure of Figs. 1 to 3 being illustrated and the router tooth being marked, therefore, with reference character 15. The only difference from the outer link 9 of Fig. 1 consists in the fact that the link 90 does not carry a depth gauge.

In Figure 6, the depth gauge 210 is carried by the center link 70, such link having an offset at 23 so that the depth gauge 210 will be supported in the same desirable location in the plane of link 90 as was the case in the construction of Figs. 1 to 4.

The router teeth in all of the illustrated constructions will desirably have clearance both upwardly and laterally from their respective cutting edges 16 and 17 at their forward margins. This very clearly appears in all of the views, each router tooth having less downward projection from the center line of the chain at its rear end than at its leading end, and being narrower at its rear end than its leading end. This feature is, of course, common in the saw chain art, and no claim of novelty is made thereto.

I claim:

1. A saw chain comprising the combination with center links substantially in a common plane and pairs of side links pivotally connecting the center links and disposed at opposite sides thereof, certain of the side links having shanks and allochiral router teeth mounted on their shanks and alternately projecting in opposite directions across the center link plane, rivets connecting the several links, the respective router teeth having toe portions provided with free ends having kerf-side cutting edges, said toe portions further having kerf-bottom cutting edges forwardly inclined toward said free ends, the kerf-side cutting edges being disposed in each instance at the side of the chain opposite the side link upon which the tooth shank is mounted and laterally beyond the maximum projection of said rivets and shanks, whereby both bottom and side cutting is done exclusively by the said kerf-side and kerf-bottom cutting edges of the toe portions of the teeth.

2. The device of claim 1 in which certain of said links are provided with depth gauge means respectively disposed in the planes of immediately succeeding shanks to lie in the path traversed by the kerf-bottom cutting edge of the toe portion of an immediately preceding router tooth and at the side of the chain opposite the side at which is disposed the free end of an immediately successive router tooth carried by such a shank.

References Cited in the file of this patent

UNITED STATES PATENTS

| | | |
|---|---|---|
| 2,508,784 | Cox | May 23, 1950 |
| 2,558,678 | Garrett | June 26, 1951 |
| 2,873,775 | Abbott | Feb. 17, 1959 |

FOREIGN PATENTS

| | | |
|---|---|---|
| 822,900 | Germany | Nov. 29, 1951 |